(12) United States Patent
Mahmoud et al.

(10) Patent No.: US 6,880,033 B1
(45) Date of Patent: Apr. 12, 2005

(54) METHODS FOR CONFIGURING SEPARATE ACCESSIBILITY OF EACH CHANNEL OF A DUAL CHANNEL SCSI CHIP

(75) Inventors: Fadi A. Mahmoud, Livermore, CA (US); Stillman F. Gates, Los Gatos, CA (US); Daniel A. Dawson, Cupertino, CA (US)

(73) Assignee: Adaptec, Inc., Milpitas, CA (US)

( * ) Notice: Subject to any disclaimer, the term of this patent is extended or adjusted under 35 U.S.C. 154(b) by 334 days.

(21) Appl. No.: 10/125,238

(22) Filed: Apr. 17, 2002

Related U.S. Application Data

(60) Provisional application No. 60/293,703, filed on May 25, 2001.

(51) Int. Cl.⁷ .......................... G06F 13/00; G06F 13/40
(52) U.S. Cl. ..................... 710/305; 710/315; 712/32; 711/114
(58) Field of Search ................... 710/305, 315, 710/104, 62, 313; 326/30; 370/257, 431; 712/32, 36, 38; 361/683–686; 711/114; 713/1

(56) References Cited

U.S. PATENT DOCUMENTS

| | | | | |
|---|---|---|---|---|
| 5,241,630 A | * | 8/1993 | Lattin, Jr. et al. | 710/310 |
| 5,347,295 A | * | 9/1994 | Agulnick et al. | 345/156 |
| 6,108,740 A | * | 8/2000 | Caldwell | 710/305 |
| 6,138,183 A | * | 10/2000 | Tien et al. | 710/22 |
| 6,157,976 A | * | 12/2000 | Tien et al. | 710/314 |
| 6,697,885 B1 | * | 2/2004 | Goodfellow | 710/22 |
| 6,785,746 B1 | | 8/2004 | Mahmoud et al. | 710/8 |

OTHER PUBLICATIONS

"Digital alpha/beta pulse shape discrimination of CsI:Tl for on–line measurement of aqueous radioactivity" by Tan, H.; DeVol, T.A.; Field, R.A. (abstract only) Publication Date: Aug. 2000.*

"Development of a flow–cell alpha detector utilizing microencapsulated CsI:Tl granules and silicon PIN–photodiodes" by Hui Tan DeVol, T.A. (abstract only) Publication Date: Nov. 4–10, 2001.*

* cited by examiner

*Primary Examiner*—Gopal C. Ray
(74) *Attorney, Agent, or Firm*—Martine & Penilla, LLP

(57) ABSTRACT

A method for configuring channels of a dual channel SCSI chip is provided which includes setting at least one bit in a first configuration space within a first channel control in the dual channel SCSI chip where the first configuration space returns a device identification information when accessed by an operating system. The method also includes setting at least one bit in a second configuration space within a second channel control in the dual channel SCSI chip where the second configuration space returns data indicating that the second configuration space does not contain any device identification information when accessed by the operating system. The first channel control is detected and managed by the operating system, and the second channel control is not detected by the operating system and is managed by a device processor.

20 Claims, 9 Drawing Sheets

METHODS FOR CONFIGURING SEPARATE ACCESSIBILITY OF EACH CHANNEL OF A DUAL CHANNEL SCSI CHIP

CROSS REFERENCE TO RELATED APPLICATION

This is a non-provisional application claiming priority from a U.S. Provisional Application Ser. No. 60/293,703 entitled "Methods for Configuring Separate Accessibility of Each Channel of a Dual Channel SCSI Chip", filed on May 25, 2001. The aforementioned application is hereby incorporated by reference.

BACKGROUND OF THE INVENTION

1. Field of the Invention

This invention relates generally to computing technology and more particularly concerns the configuration of a single SCSI chip to be used as a multi-channel device capable of being separately accessed and separately controlled for managing communication for different types of devices, such as SCSI devices and RAID devices.

2. Description of the Related Art

To access and control certain types of peripheral devices connected to a computer system, the computer generally utilizes host adapter cards (or controllers) attached to the computer's peripheral component interconnect (PCI) bus. The computer may also have peripheral device controllers built into the motherboard. These controllers serve to coordinate and manage the data communication to and from the peripheral devices. Controllers may be in the form of a video display adapter, an integrated drive electronics (IDE) controller, a small computer system interface (SCSI) controller, or other similar cards or chips which control peripheral devices. Each of these controllers manage a single type of peripheral device and, if not built into the motherboard, takes up one expansion slot on the PCI bus.

Generally, SCSI controller cards contain a certain type of computer chip known as an application-specific integrated circuit (ASIC). ASICs are usually created for a specific purpose or application such as controlling SCSI devices, RAID arrays, or other similar devices. ASICs that manage SCSI devices are commonly known as SCSI chips. A SCSI controller generally contains one SCSI chip. By use of software device drivers, a host computer can instruct a SCSI chip to manage a specific peripheral device and control the data transfer between the peripheral device and the host computer.

In a computer system with SCSI peripherals, each different type of SCSI device that requires its own processor is connected to a different SCSI chip that controls that type of device. For example, the SCSI devices that interface with additional hardware such as RAID and the SCSI devices that use the computer's CPU require separate SCSI chips/controllers to manage the individual peripheral device types.

FIG. 1 shows a computer configuration where two different types of peripheral devices are connected to a computer system. For example, a SCSI chip-A 10 with single channel is connected to peripheral devices 16. The SCSI chip-A 10 controls the input/output activities of the peripheral devices 16 and regulates the flow of data between the peripheral devices 16 and a host computer with a host central processing unit (CPU) 20. For the control of RAID storage devices, a RAID input output processor (IOP) 14 is connected to a SCSI chip-B 12 with a single channel which is in turn connected to a RAID storage array 18. The RAID IOP 14 manages all the read and write operations to the RAID storage array 18 by directing the SCSI chip-B 12 to perform the read and write operations of the RAID storage array 18. As can be seen, in a complex computing environment where numerous types of SCSI peripheral devices (such as CD-ROMs, optical discs, RAID devices, hard disk drives, removable storage drives, tape backup drives, etc.) are connected to a computing system, different SCSI chips may be required to control the different functionality. One single channel SCSI chip may control up to 15 devices with different software to match these device types, but as performance demand increases, it is required to separate higher performance devices by using additional SCSI chips. Furthermore, the option of adding multiple controller chips to a motherboard is limited and significantly increases the price of the system as well as complicating the integration and interoperability. Therefore, a prior art system using different SCSI chips for different types of peripheral devices is inefficient, costly, and more difficult to manage.

To ease the system complication of multiple single channel SCSI chips, dual channel SCSI chips were introduced that shared the chip single system interface. This dual channel SCSI chip used the same software for both channels and therefore could only perform as one type of SCSI channel and cannot control multiple types of peripheral devices having different functionality which limited expanded device configurations.

SUMMARY OF THE INVENTION

There is a need for a way that a single SCSI chip can control multiple types of peripheral devices having different functionality. Such a way to control a SCSI chip would allow multiple peripheral devices to be connected through a single controller in a PCI slot or a single chip located on the motherboard. This would permit many more peripherals to be connected to a computer and decrease the need for excess computer resources to manage the peripheral devices. In addition, there is a need for the ability to hide one of the channels of a SCSI chip so conflicts do not occur between an operating system wanting to control both channels and an additional device processor wanting to control one of the channels. Several inventive embodiments of the present invention are described below.

In one embodiment, a method for configuring channels of a dual channel SCSI chip is provided which includes setting at least one bit in a first configuration space within a first channel control in the dual channel SCSI chip where the first configuration space returns a device identification information when accessed by an operating system. The method also includes setting at least one bit in a second configuration space within a second channel control in the dual channel SCSI chip where the second configuration space returns data indicating that the second configuration space does not contain any device identification information when accessed by the operating system. The first channel control is detected and managed by the operating system, and the second channel control is not detected by the operating system and is managed by a device processor.

In another embodiment, a method for configuring channels of a dual channel SCSI chip is provided which includes setting at least one bit in a first configuration space within a first channel control in the dual channel SCSI chip where the first configuration space returns a first device identification information when accessed by an operating system. The method also includes setting at least one bit in a second configuration space within a second channel control in the dual channel SCSI chip where the second configuration space returns a null data indicating that the second configuration space does not contain any device identification information when accessed by the operating system. The method further includes returning the first device identification information from the first channel control when the operating system accesses the first configuration space, and returning the null data from the second channel control when the operating system requests access to the second configuration space. The first channel control is detected and managed by the operating system, and the second channel control is not detected by the operating system and is managed by a device processor.

In yet another embodiment, a method for configuring channels of a dual channel SCSI chip is provided which includes providing a first control bit in a first PCI configuration space of a first channel control and a second control bit in a second PCI configuration space of a second channel control, and determining whether the first control bit is asserted and whether the second control bit is asserted. When at least one of the first control bit and the second control bit is asserted, the method includes marking the first PCI configuration space and the second PCI configuration space to indicate that the first channel control manages a first device type and that the second channel control manages a second device type. The second device type is different than the first device type. When at least one of the first control bit and the second control bit is asserted, the method includes responding to configuration space accesses from an operating system by allowing access to data in the first PCI configuration space when the first control bit of the first channel control is not asserted and by allowing access to data in the second PCI configuration space requested by the operating system when the second control bit of the second channel control is not asserted. When at least one of the first control bit and the second control bit is asserted, the method also includes responding to configuration space accesses by an operating system by not allowing access to data in the first PCI configuration space when the first control bit of the first channel control is asserted, and by not allowing access to data in the second PCI configuration space when the second control bit of the second channel control is asserted. When neither of the first control bit and the second control bit are asserted, the method includes marking the first PCI configuration space and the second PCI configuration space to indicate that the first channel control and the second channel control manage a same device type. When neither of the first control bit and the second control bit are asserted, the method also includes responding to configuration space accesses by an operating system by allowing access to data requested by the operating system.

The advantages of this invention are numerous. Most notably, the present invention enables hiding of one channel of the dual channel SCSI chip. By hiding one of the channels from an operating system, conflicts between the operating system and a device processor such as, for example, a RAID IOP may be avoided. Therefore, two different types of devices may be controlled by a single SCSI chip without problems of the operating system trying to control or assign a device driver for a channel managed by the device processor. As a result, the dual channel SCSI chip may be optimally controlled and management of peripheral devices may be optimized.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a method and apparatus to control multiple peripheral devices without having to use multiple ASIC chips, e.g., such as SCSI chips by utilizing a dual channel SCSI chip while at the same time having the ability to hide one of the channels from the operating system to avoid conflicts between the operating system and a device processor. It will be obvious, however, to one skilled in the art, that the present invention may be practiced without some or all of these specific details. In other instances, well known process operations have not been described in detail in order not to unnecessarily obscure the present invention.

As described in detail in U.S. application Ser. No. 09/680, 834, entitled "Dual-Channel SCSI Chips and Methods for Configuring Separate Interoperability of Each Channel of the SCSI Chip", a single chip can be made to operate as if it were two separate chips. The aforementioned application is hereby incorporated by reference. The single chip (e.g., a SCSI chip) can thus be used in environments where conventional SCSI devices are connected to the computer system and where there is also a need to connect RAID storage devices. As is well known, such implementations are common in computer server environments. In a preferred embodiment, the configuration of the SCSI chip can be accomplished such that each part of the SCSI chip can communicate with appropriate device processors. For instance, a SCSI channel of a chip can be made to communicate with a computer's CPU while a RAID channel of the same chip can separately communicate with a RAID IOP. Thus, the splitting features (e.g., Ganling) of the present invention provide for a robust configuration that improves on overall system efficiency and reduces the cost of implementation. In addition, the dual channel SCSI chip may be configured so that one channel of the two channels may, in a sense, be hidden from an operating system. By use of the method for hiding, the operating system does not operate on or manage one control channel of the dual channel SCSI chip because the operating system does not know it exists. Therefore, a device processor such as, for example, a RAID IOP may operate on the channel control not managed by the operating system. Therefore, use of the intelligent and powerful method for hiding one channel of a dual channel SCSI may reduce the conflicts that may occur if the operating system and a device processor attempt to control the same channel control on a SCSI chip.

Figure 1:
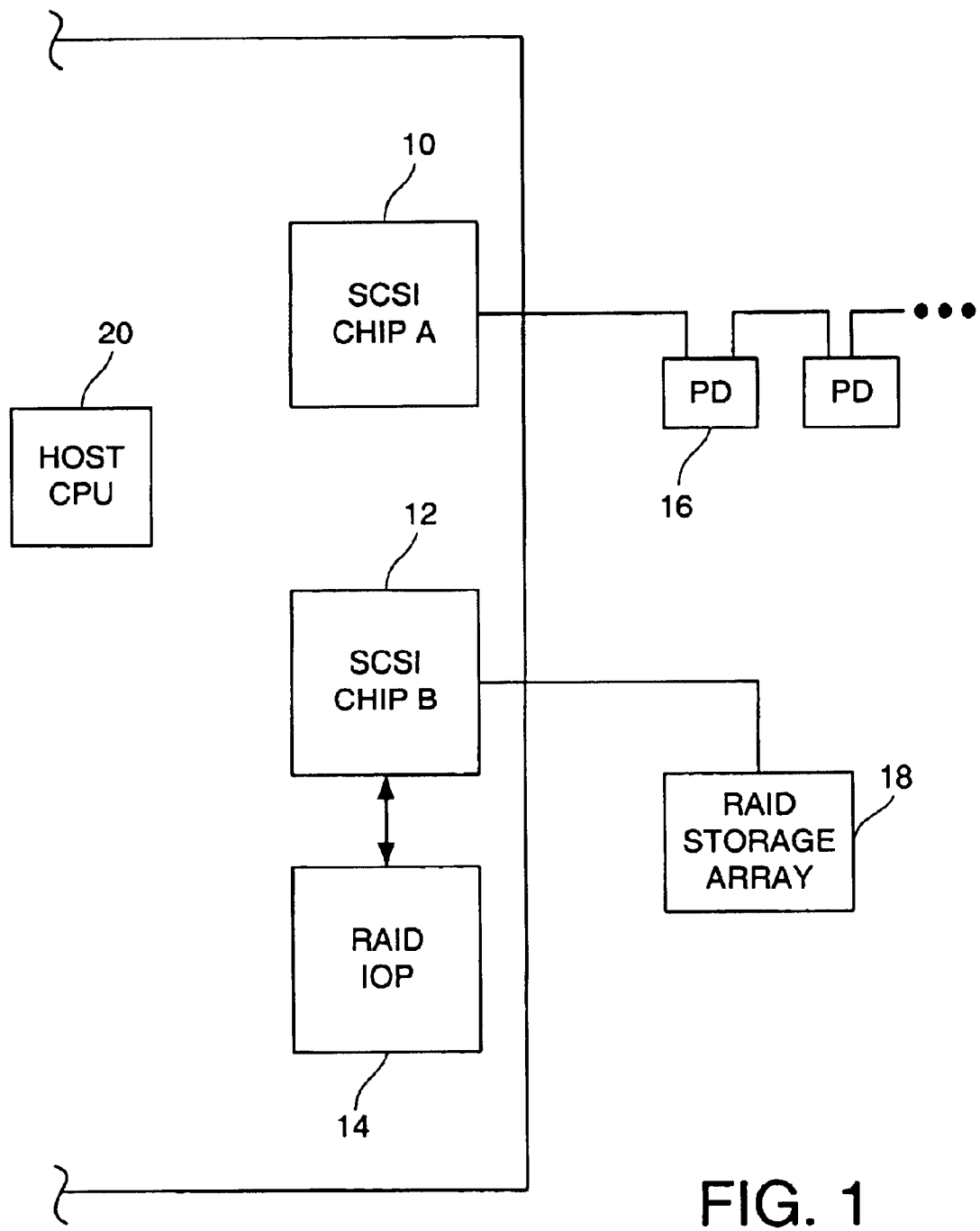
FIG. 1 shows a computer configuration where two different types of peripheral devices are connected to a computer system.
Figure 2A:
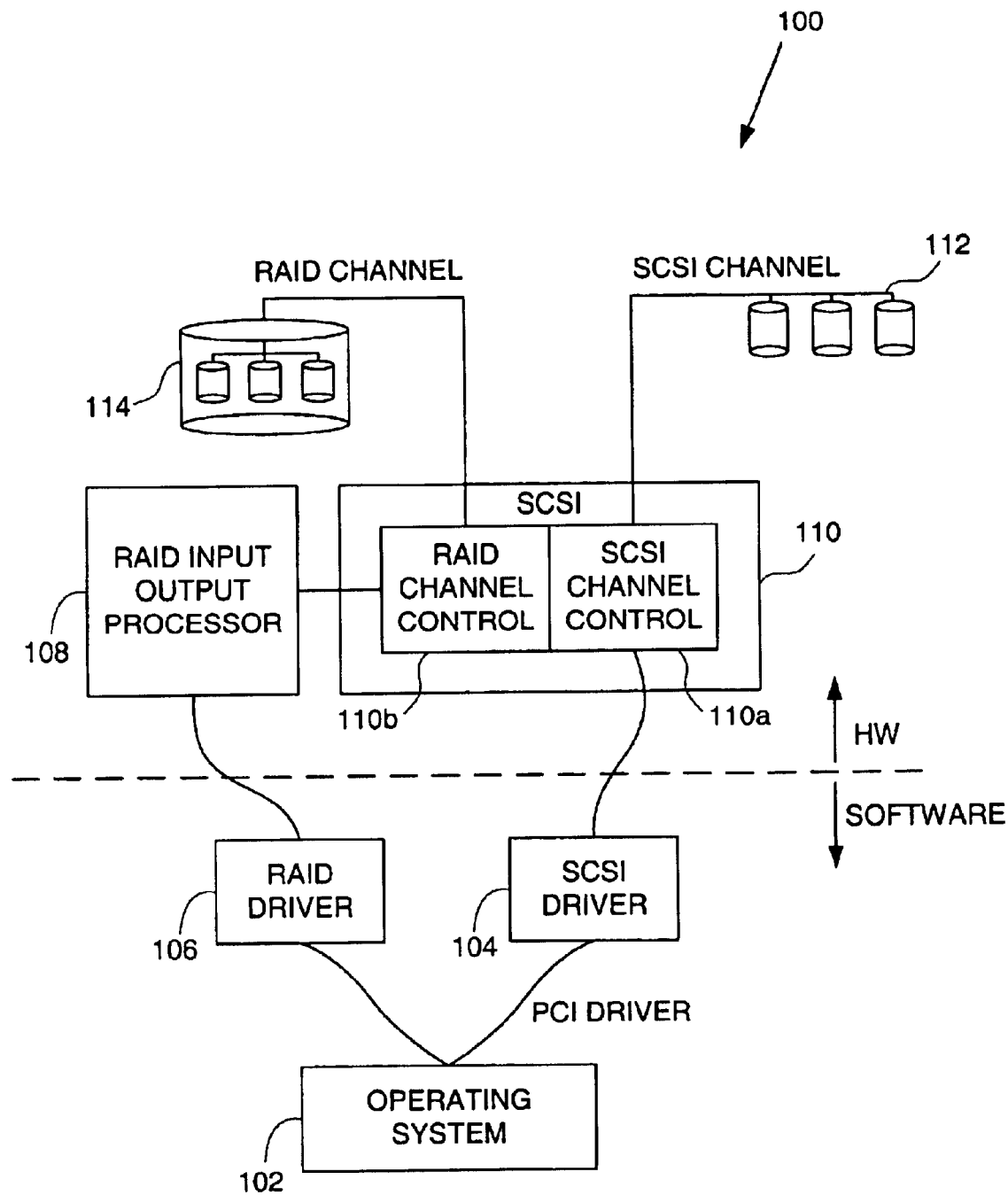
FIG. 2A shows a computing environment including a dual channel SCSI chip system with two peripheral devices connected to the dual channel SCSI chip in accordance with one embodiment of the present invention.

FIG. 2A shows a computing environment including a dual control SCSI chip system 100 with two peripheral devices connected to the dual control SCSI chip 110 in accordance with one embodiment of the present invention. The dual control SCSI chip 110 includes a SCSI channel control 110a and a RAID channel control 110b. It should be appreciated that the dual control SCSI chip may control any suitable type or number of peripheral, external, or internal devices such as, for example, storage devices, communication devices, etc. The RAID channel control 110b of the dual channel SCSI chip 110 is managed by a RAID input output processor (IOP) 108 while the SCSI channel control 110a of the dual channel SCSI chip 110 is managed by a SCSI driver 104. The SCSI control channel 110a is also connected to a SCSI channel 112 which includes any suitable number or types of SCSI devices. The RAID channel control 111b is connected to a RAID channel 114 which includes RAID arrays. The RAID IOP 108 is controlled by a RAID driver 106. The SCSI driver 104 and the RAID driver 106 are utilized by an operating system 102 to manage devices attached to the SCSI chip 110.

As a result, in this embodiment, the operating system 102 communicates with the SCSI channel 112 through the use the SCSI driver 104 that manages functionality of the SCSI channel control 110a. If the operating system 102 requires data transfer to or from a SCSI channel 112, it will instruct the SCSI channel control 110a by way of the SCSI driver 104 to direct the input and output operations of the SCSI channel 112. Similarly, the RAID IOP 108 controls the data transfer from the RAID channel 114 to the operating system through the use of the same SCSI chip 110 but through the RAID channel control 10b. The RAID channel control 10b will therefore take instructions from the RAID IOP 106 and direct the read and write operations of the RAID arrays on the RAID channel 114. Therefore, in one embodiment, the SCSI chip 110 controls two different types of peripheral devices. In certain circumstances, the operating system may attempt to assign a driver to the RAID channel control 10b. If this occurs, the operating system may use the driver in an attempt to manage the RAID channel control 110b. In this example, unless the RAID channel control 110b is hidden from the operating system 102, the RAID channel control 110b may be unknowingly controlled by both the operating system 102 and by the RAID IOP 108. Therefore, numerous problems may occur where a single channel control is managed by both the RAID IOP 108 and the operating system 102. For example, problems may occur during shut down when the operating system 102 may shut down the RAID channel 114 before the RAID IOP 108 has a chance to store data in the devices connected to the RAID channel 114. Thus, the RAID channel control 110b through instructions from the operating system shuts down the RAID channel before the RAID IOP 108 can have a chance to initiate the required access to the RAID channel 114. But, the present invention enables intelligent hiding of the RAID channel control 110b from the operating system 102 therefore enabling the RAID IOP 108 to fully control the RAID channel control 110b without the interference from the operating system 102.

It should be obvious to one skilled in the art that the SCSI chip 110 may be connected to one SCSI device or to any suitable combination of devices. For example, instead of being connected to one SCSI device and one RAID arrays, the SCSI chip 110 may be connected to two separate sets of SCSI devices or to two separate sets of RAID arrays. Therefore, the SCSI chip 110 increases the functionality and efficiency of the computing environment by having the capability of controlling different types of devices independently through the hiding feature instead of being limited to controlling one type of device.

Figure 2B:
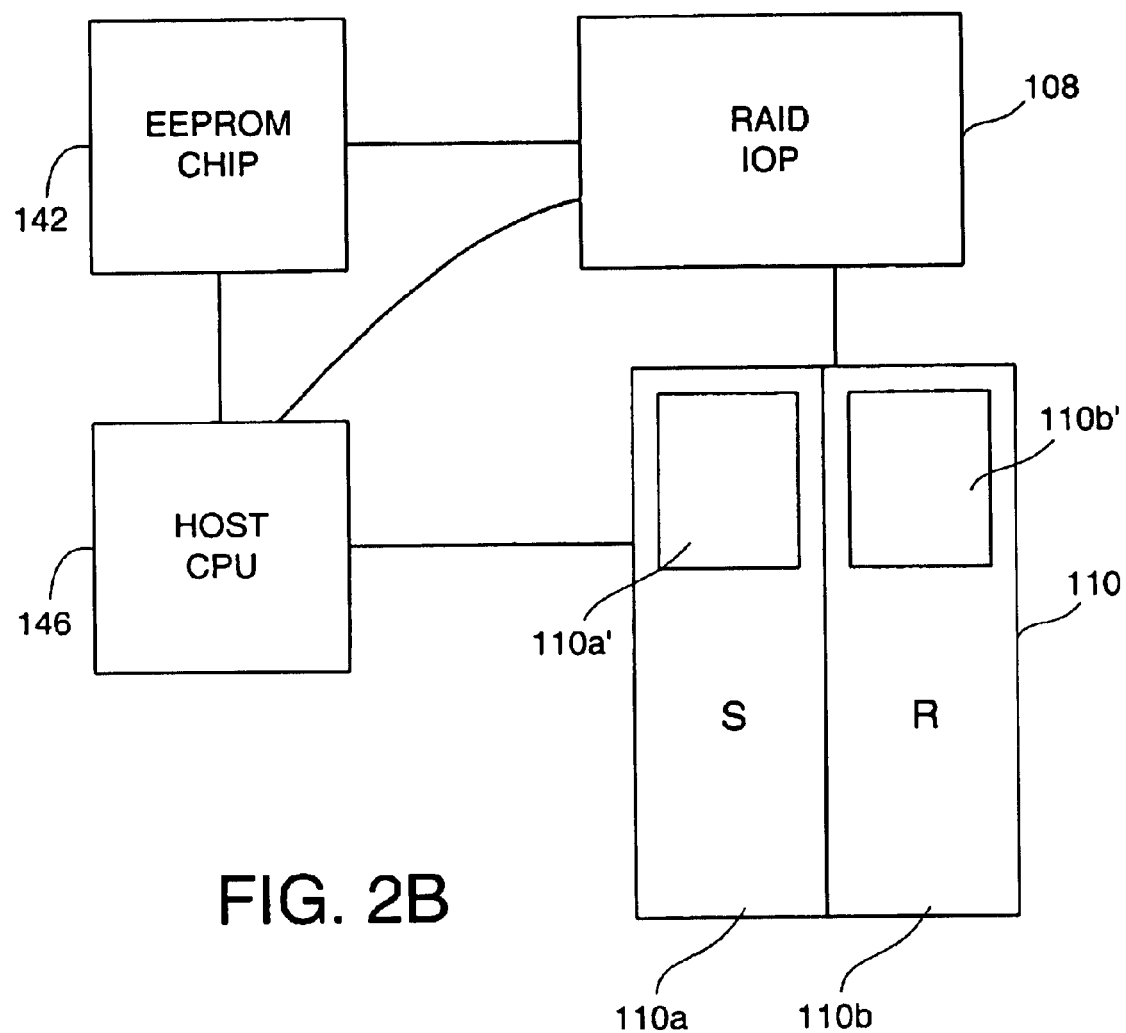
FIG. 2B illustrates a dual channel SCSI chip with a SCSI channel control and a RAID channel control in accordance with one embodiment of the present invention.

FIG. 2B illustrates a dual channel SCSI chip 110 with a SCSI channel control 110a and a RAID channel control 110b in accordance with one embodiment of the present invention. In this embodiment, the dual channel SCSI chip has two different channel controls, each with its own PCI configuration spaces 110a' and 110b'. The SCSI channel control 110a is connected to a host CPU 146 which is also connected to an EEPROM chip 142. The RAID channel control 110b is connected to a RAID IOP 108 which is in turn connected to the EEPROM chip 142. The EEPROM chip 142 may contain the configuration information for use by the channel controls 110a and 110b to intelligently manage devices connected to the dual channel SCSI chip 110. In one embodiment, the SCSI channel control 110 includes a SCSI PCI configuration space 110a' and the RAID channel control 110b includes a RAID configuration space 110b'. Each of the configurations spaces 110a' and 110b' may include information regarding the configuration of the SCSI channel control and the RAID channel control respectively. In one embodiment, as described in reference to FIG. 3 below, each of the configuration spaces 110a' and 110b' may contain hide and unhide bits which may hide or show either the SCSI channel control 110a or RAID channel control 110b. It should be understood that the hide/unhide bits may be assigned other terminology such as, for example, control bit, etc., that may describe the functionality of the bits. In another embodiment, one of the PCI configuration spaces 110a' and 110b' may have no data in locations where an operating system typically looks to find a channel control for a connected device. This embodiment is described in further detail below in reference to FIG. 4. As can be seen, one of the channel controls in the dual channel SCSI chip 110 may be configured in numerous ways to avoid detection or avoid control by the operating system. In such a fashion, one of the channel controls 110a and 110b may be controlled by a device processor such as, for example, the RAID IOP 108.

Figure 3:
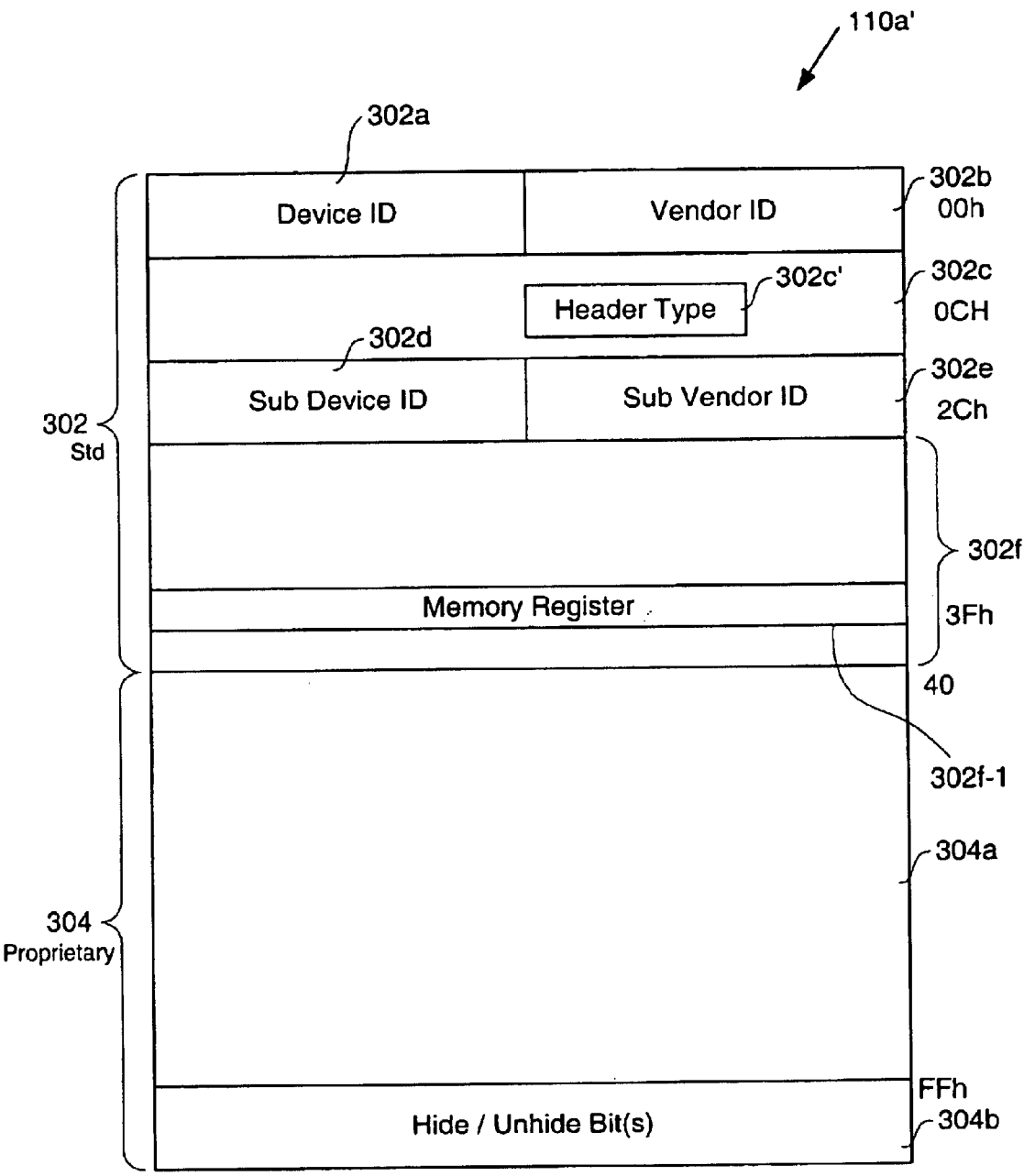
FIG. 3 shows a PCI configuration space in a channel control of a dual channel SCSI chip in accordance with one embodiment of the present invention.

FIG. 3 shows a PCI configuration space 110a' in a channel control of a dual channel SCSI chip in accordance with one embodiment of the present invention. The PCI configuration space 110a' includes a standard configuration space 302 and a proprietary configuration space 304. The PCI configuration space 110a' includes different types of configuration information in different memory spaces. It should be appreciated that any suitable type of configuration information (also known as device identification information) may be included in any suitable way. In one embodiment, configuration information such as, for example, a device ID 302*a* and a vendor ID 302*b* are located in PCI configuration space address 00*h*. In addition, configuration information such as, for example, a sub device ID 302*d* and a sub vendor ID 302*e* are located in a PCI configuration space address 2Ch. PCI configuration spaces 302*c* and 302*f* are located in the standard configuration space 302 along with spaces for the device ID 302*a*, vendor ID 302*b*, sub device 302*d*, and sub vendor ID 302*e*. A memory register 302*f*-1 is located within the PCI configuration space 302*f*.

The proprietary configuration space 304 includes a proprietary space 304*a* which occupies the PCI configuration space address 40 to FFh. A hide/unhide bit 304*b* is located in the proprietary configuration space located in the address FFh. The hide/unhide bit 304*b* may include any suitable type of data that would distinguish the channel control as being visible or hidden to an operating system. If the operating system is able to "see" the channel control with the configuration space 110*a*' (the hide/unhide bit 304*b* is set to unhide) then the operating system will utilize a driver to manage the channel control. If the operating system is not able to "see" the channel control with the configuration space 110*a*' (the hide/unhide bit 304*b* is set to hide) then the operating system will not be able to manage the channel control because the operating system will not know that the channel control does not exist. In this circumstance, the channel control may be managed by a device processor such as, for example, a RAID IOP. In this manner there will not be conflicts between the operating system and another processor such as a RAID IOP in the control of dual channel controls within one dual channel SCSI chip.

FIG. 3 also shows an embodiment where the PCI configuration space 110*a*' includes Header Type space 302*c*' which may contain a management bit. The management bit may be set to a particular value to indicate the configuration of the SCSI chip 110 (e.g., whether a particular channel control is SCSI or RAID). It should be understood that the Header Type space 302*c*' may be located in any suitable location within the PCI configuration space 110*a*'. In one embodiment, the Header Type space 302*c*' is located in address 0Ch. It should also be appreciated that the management bit may be located in any suitable location within the PCI configuration space 110*a*'. The use of the management bit (also known as a multifunction device type bit) is described in further detail in reference to FIG. 8.

Figure 4:
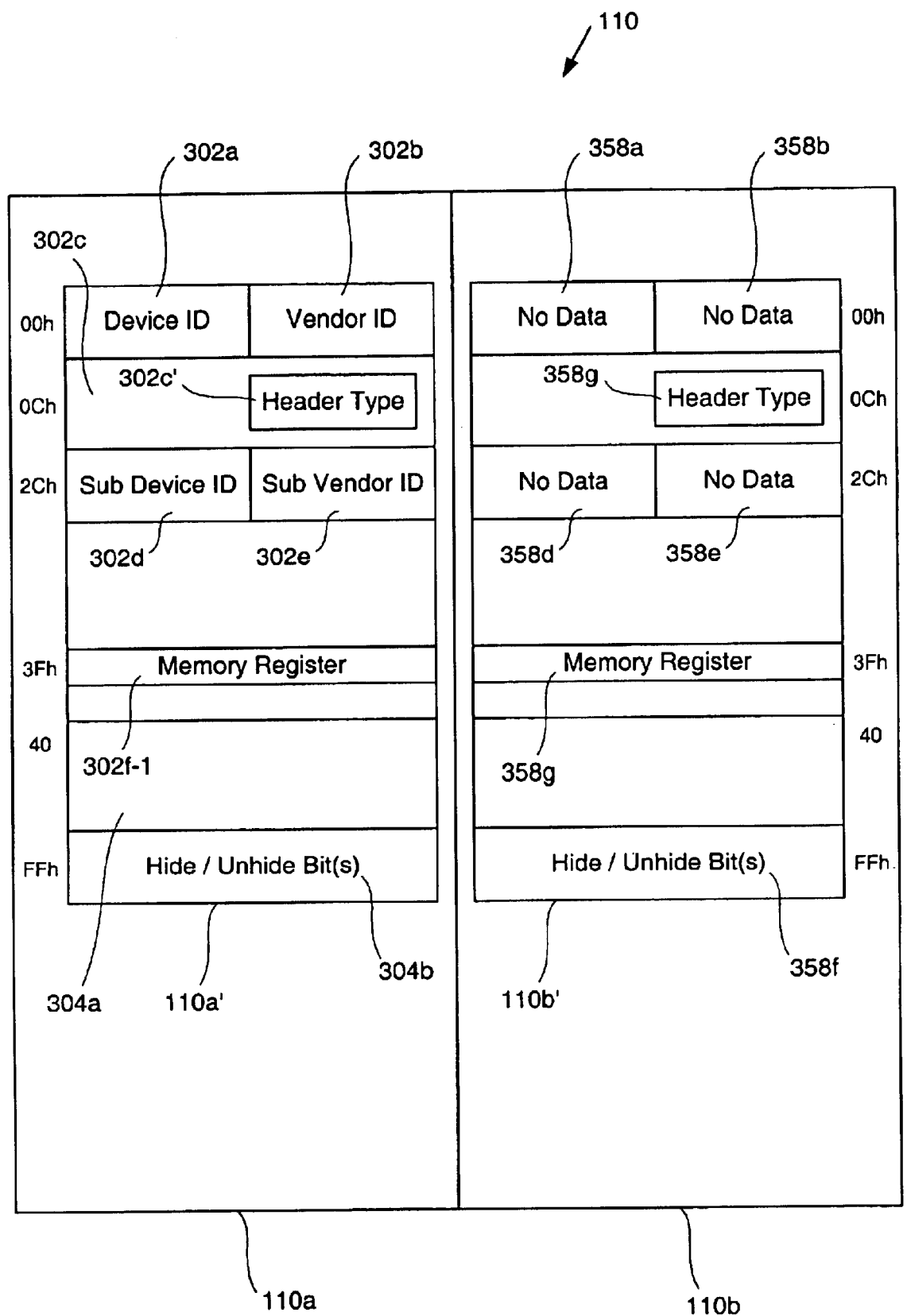
FIG. 4 illustrates a dual channel SCSI chip with different PCI configuration spaces for each of the channel controls and in accordance with one embodiment of the present invention.

FIG. 4 illustrates a dual channel SCSI chip 110 with different PCI configuration spaces for each of the channel controls 110*a* and 110*b* in accordance with one embodiment of the present invention. In this embodiment, the channel control 110*a* includes the PCI configuration space 110*a*'. The PCI configuration space 110*a*' includes a device ID 302*a*, a vendor ID 302*b*, a standard configuration space 302*c*, a sub device ID 302*d*, and a sub vendor ID 302*e*. The PCI configuration space also includes the proprietary space 304*a* which occupies the PCI configuration space address 40 to FFh. The hide/unhide bit 304*b* is located in the proprietary configuration space located in the address FFh. In one embodiment, the hide/unhide bit 304*b* may be set to either enable hiding of a channel control or allow access to the channel control thereby intelligently creating a way to separately control the channel control 110*a*.

In one embodiment, a channel control 110*b* includes a PCI configuration space 358. The PCI configuration space 110*b*' in contrast to the PCI configuration space 110*a*', has no data in the PCI configuration space addresses where a device ID, vendor ID, sub device ID, and a sub vendor ID normally resides. In one embodiment, the PCI configuration space addresses where the device ID, vendor ID, sub device ID, and sub vendor ID typically exists are shown by data space 358*a*, 358*b*, 358*d*, and 358*e* respectively. As is usual, a configuration space 358*c* contains other configuration data. It should be understood that the device ID, vendor ID, sub device ID, and sub vendor ID may be located in any suitable PCI configuration data space in any suitable memory address. In one embodiment, the data spaces 358*a* and 358*b* are located in address 00*h*, data spaces 358*d* and 358*e* are located in address space 2Ch, and a hide/unhide bit 358*f* is located in the proprietary configuration space located in the address FFh.

In this embodiment where actual channel control D's such as, for example, device ID's, vendor ID's, sub device BD's, and sub vendor ID's are utilized by an operating system to determine the channel controls that exist, the channel controls in a dual channel SCSI chip may not only be controlled separately, but the channel controls may be managed so one channel control is managed by the operating system and the other channel control may be managed by a device control processor such as, for example, a RAID IOP. Therefore, separate management of the channels controls may be conducted without concern of conflicts between the device control processor and the operating system. This may be achieved due to the ability of the present invention to effectively hide one of the channel controls from the operating system so the hidden channel (in this embodiment, channel control 110*b*) may be separately controlled by an entity other than the operating system 102.

Conflicts between what manages the different channel controls may be avoided by the present invention because generally, the operating system checks the PCI configuration space and more specifically, certain data within the PCI configuration space to determine what devices may be connected to the SCSI chip. Typically, the operating system checks for a device ED and a vendor ID at address 00*h* and for a sub device ID and a sub vendor ID at address 2Ch. When this happens, device identification information such as, for example, device ID, vendor ID, sub device ID, and sub vendor ID are retrieved by the operation system. It should be appreciated that any suitable type of information that can identify a device may be included in the device identification information. Once the operating system finds such a device, it believes that it should manage the device and assigns a device driver to control that channel control if the operating system sees the identification data for both channels on a dual channel SCSI chip, the operating system typically assigns drivers to manage both of the channel controls. In certain circumstances as described above, when an additional device processor such as a RAID IOP manages a RAID channel control and the operating system attempts to manage the same RAID channel control conflicts may occur. Such conflicts may be akin to the proverbial right hand not knowing what the left hand is doing. To prevent these types of conflicts, a configuration space such as, for example, the configuration space 110*a*', may be configured to include ID data such as the ID's 302*a*–302*e* while the other channel control such as, for example, the configuration space 358 may be configured to not have such D) data in the typical memory addresses. Therefore, in such a configuration, the operating system determines that it should control the channel control with the ID data such as, for example, the channel control 11*a* and not control the channel control 110*b* because the operating system does not think that the other channel control is operating to control a different device. In this way, the channel control 110*b* is "hidden" from the operating system so another device processor such as, for example, a RAID IOP may control the channel control 110*b*. So by intelligently controlling what PCI configuration data is visible to the operating system, the operating system may be effectively "fooled" into believing that the dual channel SCSI chip only has one channel control when it in fact has another channel control that is managed by a device processor such as, for example, the RAID IOP.

In another embodiment, the PCI data configuration space address FFh may be utilized to have hide and unhide bits to indicate that a certain control channel is to be managed by the operating system. In this embodiment, the data spaces 358*a*, 358*b*, 358*d*, and 358*e* may include a device D, vendor ID, sub device ID, and a sub vendor ID, but the operating system does not receive the device identification information in responses to its requests for access of data at the 00h or 2Ch registers. Therefore, if the hide/unhide bit also known as a first control bit in a first configuration spaces and a second control bit in a second configuration space) is asserted to hide the channel control, all attempts to access vendor ID, device ID, subdevice ID and a subvendor ID results in master aborts and returns a detected value of FFFFh. Such a value is an indicator to the operating system that no value (e.g., null data) exists for the data spaces 358*a*, 358*b*, 358*d*, and 358*e* which would typically contain device identification information for the channel control. As a result, the operating system does not attempt to manage the channel control and does not create a driver for it. Therefore, the device identification information received by the operating system indicate that no data is in the PCI configuration spaces. It should be understood that any suitable type of data may be utilized as a hide/unhide bit to indicate a one channel chip or a two channel chip. In one embodiment, if a hide/unhide bit is set to one that may mean that the chip is a dual channel SCSI chip with two channel controls that control two devices. If the hide/unhide bit is set to one that can then mean that the SCSI chip has one control channel to control one device. Therefore, either one of a dual channel SCSI chip may be effectively "hidden" from software that detects PCI devices in a typical fashion.

As with the configuration space 110*a*', the PCI configuration space 110*b*' may also include a Header Type space 358*g* which can include a management bit. As shown in FIG. 4, in one embodiment, the Header Type space 358 may be located in address 0Ch. The value of the management bit may indicate whether the SCSI chip is one channel or dual channel with a single functionality or multiple functionality. The management bit is described in further detail in reference to FIG. 8.

Figure 5:
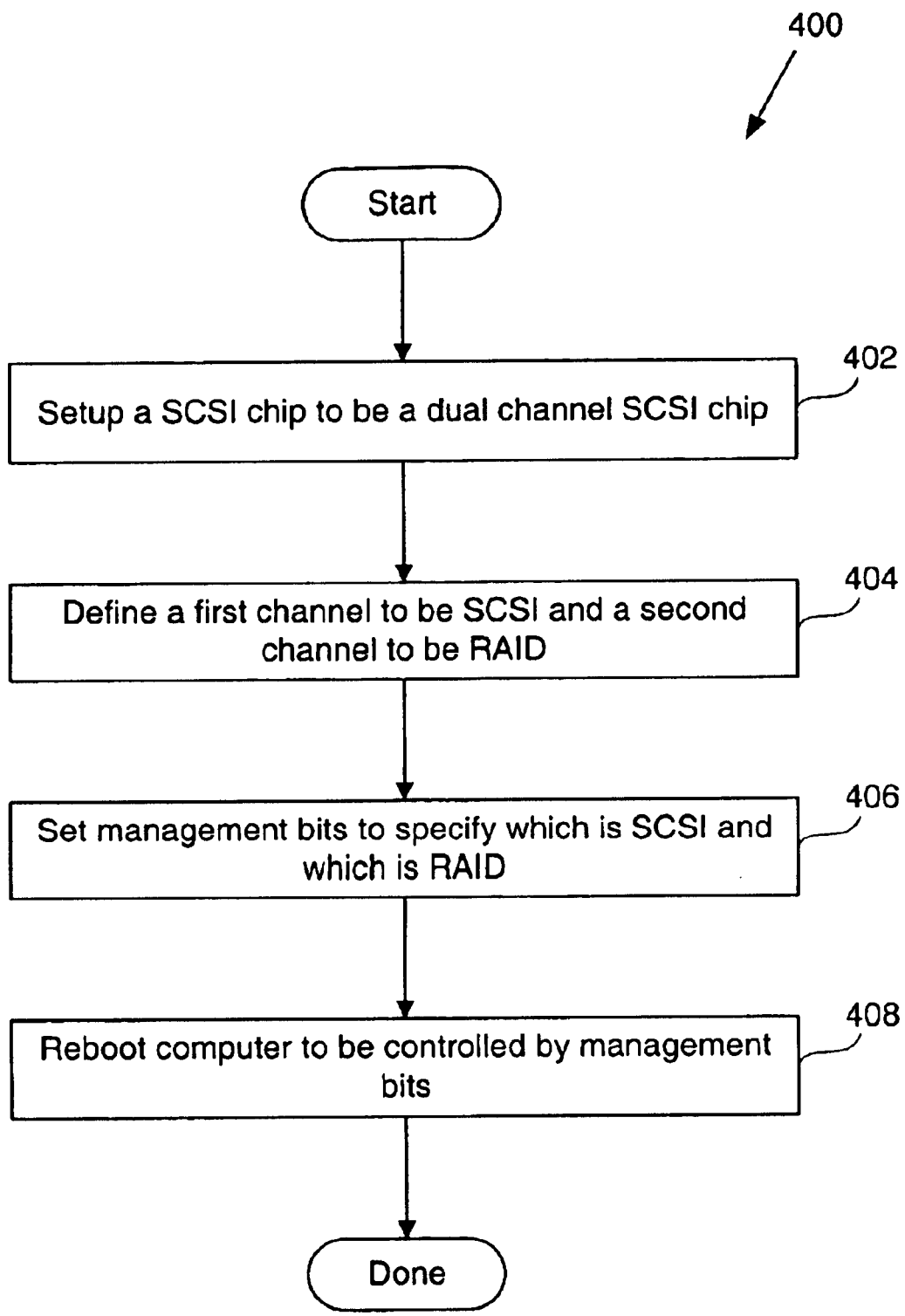
FIG. 5 shows a flowchart defining a method for setting up a dual channel SCSI chip in accordance with one embodiment of the present invention.

FIG. 5 shows a flowchart 400 defining a method for setting up a dual channel SCSI chip in accordance with one embodiment of the present invention. It should be understood that the processes depicted in the flowcharts depicted in FIG. 5 through FIG. 8 may be in a program instruction form written on any type of computer readable media. For instance, the program instructions can be in the form of software code developed using any suitable type of programming language.

The method begins with operation 402 where a SCSI chip is set up to be a dual channel SCSI chip. In this operation, a SCSI chip is configured so one side (also known as channel control) of the SCSI chip may control one type of device and another side may control another type of device.

After operation 402, the method proceeds to operation 404 where a first channel is defined to be SCSI and a second channel to be RAID. In this operation, one of the two channels on the dual channel SCSI chip is configured to be a SCSI channel control. The other remaining channel of the dual channel SCSI chip is configured to be a RAID channel control.

In this way, the dual channel SCSI chip may operate as two separate SCSI chips that may have two independent channels that may assist in controlling at least two different types of devices such as, for example SCSI devices, RAID arrays, etc.

After operation 404, the method advances to operation 406 where management bits are set to specify which is a SCSI channel and which is a RAID channel. In one embodiment, a user input such as, for example, control-A may be utilized to set the management bits. The management bits may be stored in any suitable type of non-volatile memory. In operation 406, management bits can indicate what devices each of the dual channel SCSI chip controls and whether a particular channel control is to be hidden or not. It should be understood that any suitable type of device in any suitable combination may be controlled by the channels of the dual channel SCSI chip. In one embodiment, one of the dual channels is a SCSI channel control that may be utilized to control SCST devices. The other channel may be a RAID channel control utilized to manage RAID array (s).

Then method 408 reboots the computer to be controlled by management bits. Once the management bits are set, the computer may then be restarted so the settings made when the management bits were set may take place after the management bits have been retrieved from the non-volatile memory. Therefore, once the computer system is restarted, each of the channels of the dual channel SCSI chip may be utilized to control different types of devices without conflicts between the operating system and the device processor.

Figure 6:
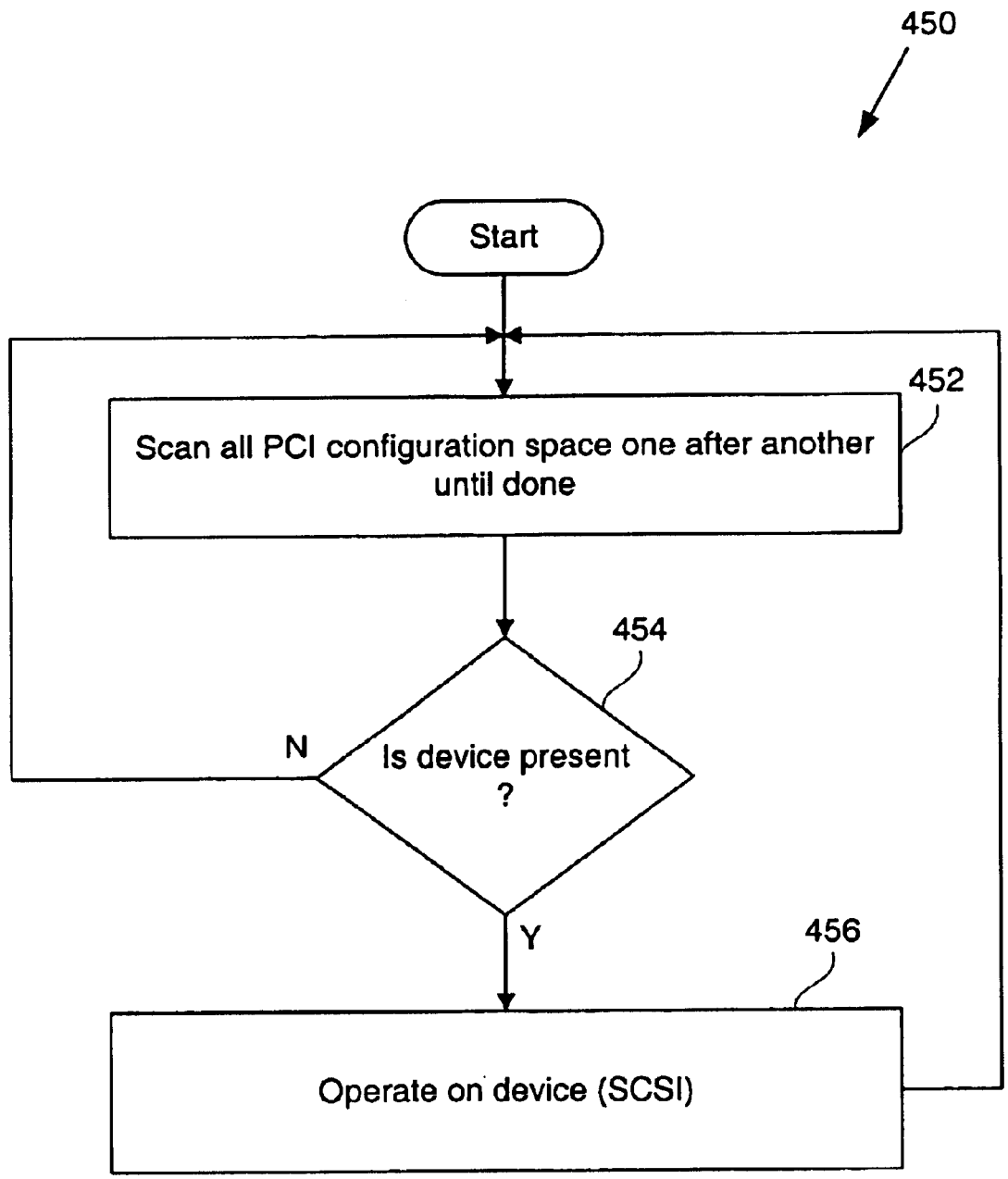
FIG. 6 illustrates a flowchart defining a method for locating a device controlled by a dual channel SCSI chip in accordance with one embodiment of the present invention.

FIG. 6 illustrates a flowchart 450 defining a method for locating a device controlled by a dual channel SCSI chip in accordance with one embodiment of the present invention. It should be understood that the operations as described in FIG. 6 are operations embodied in any suitable generic software that may scan for PCI devices such as, for example, system BIOS, SCSI BIOS, etc. The method begins with operation 452 where all PCI configuration space is scanned one after another until done. In this operation, the operating system examines all of the PCI configuration spaces. It should be understood that the operating system may examine any or some of the PCI configuration spaces in any suitable way or order as long as the examination enables the operating system to determine if a channel control is available for management by the operating system. By checking the PCI configurations spaces, the operating system may detect what device control channels are present. After operation 452, the method proceeds to operation 454 where it is determined if a device is present by checking the device identification information. In this operation, the operating system can determine what device are connected to the system and what devices the operating system needs to control depending on the device identification information.

If operation 454 shows that a device is not present then the method repeats operation 452 and operation 454. The device is not found to be present when the operating system does not find the device identification information. If the device is present, the method proceeds to operation 456 where the device (SCSI) is operated on. In this operation, the operating system may manage the SCSI channel to operate the device by use of, for example, device drivers. It should be understood that the operating system may operate on the SCSI device in any suitable fashion that allows it to take control of the SCSI device. As can be seen, if the device identification information is hidden or not able to be read, the device is not operated on by the operating system, and a device processor can then operate on the device.

After operation 454, the method repeats operation 452 until all the PCI configuration spaces have been scanned. After all of the configuration spaces have been scanned, the flowchart 450 ends. In this way, the channel on one or more dual channel SCSI chips may be scanned and operated on so each individual SCSI channel is managed by the operating system.

Figure 7:
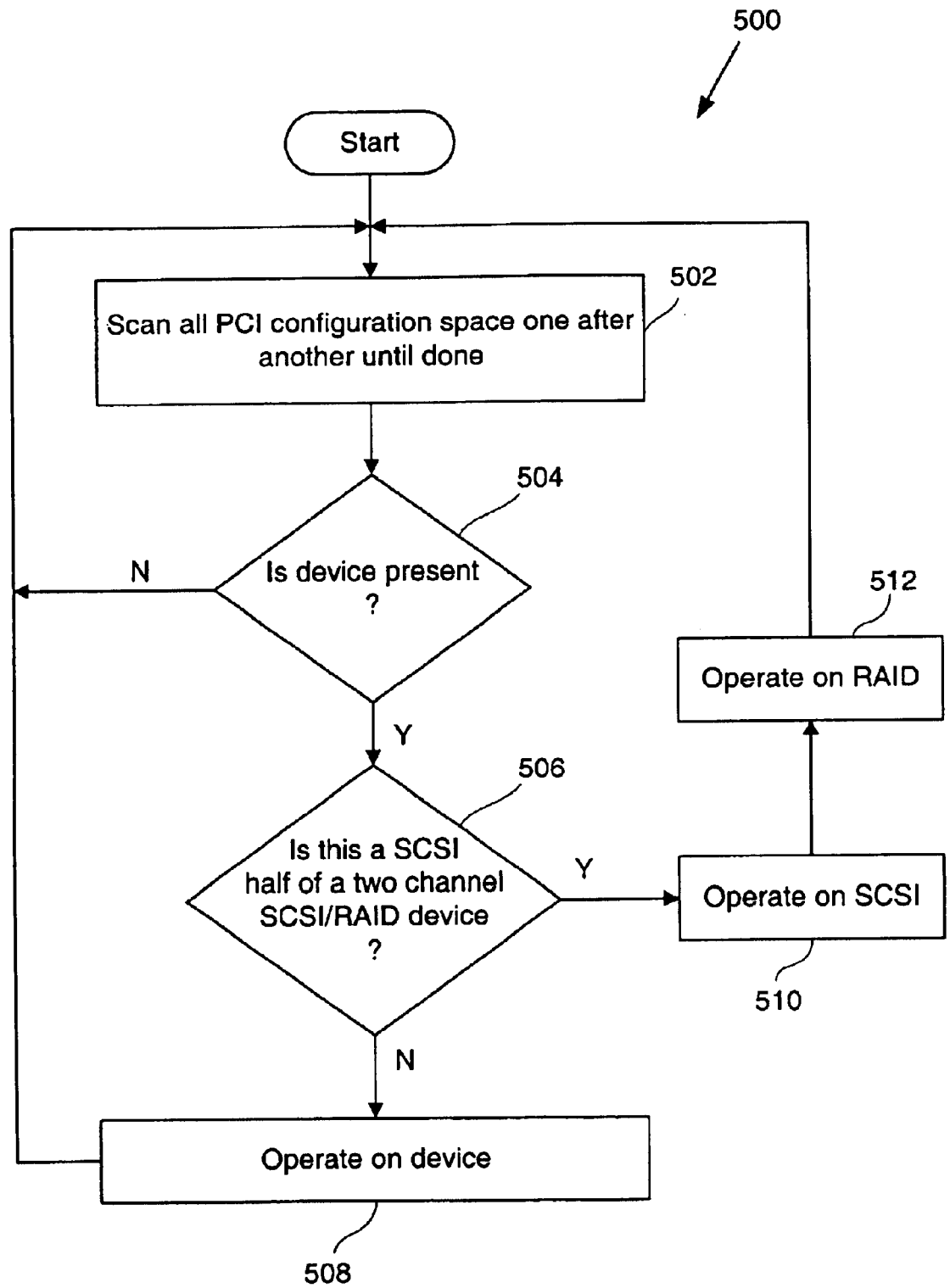
FIG. 7 shows a flowchart defining a method for detecting channels of a dual channel SCSI chip in accordance with one embodiment of the present invention.

FIG. 7 shows a flowchart 500 defining a method for detecting channels of a dual channel SCSI chip in accordance with one embodiment of the present invention. It should be understood that the operations as described in FIG. 7 are operations embodied in any suitable specialized software utilized for detecting PCI devices which knows that the SCSI chip is a dual channel chip.

The method begins at operation 502 where all PCI configuration space is scanned one after another until done. In this operation, the operating system examines the PCI configuration spaces of chips on host adaptor cards that assist in the control of devices connected to the computer.

After operation 502, the method advances to operation 504 where it is determined if a device is present. The device is known to be present if during scanning of the PCI configuration, the operating system finds certain identification information such as, for example, device ID, vendor, ID, sub device ID, sub vendor ID, etc. Finding of such information tells the operating system that a certain device is connected to the computer and controlled by the processor chip being scanned.

If a device is not present or identified by the PCI configuration space being scanned, operation 502 and 504 is repeated. If the device is present, the method moves to operation 506 where the method determines if the device is controlled by a SCSI half of two channel SCSI/RAID device. This may be determined by either examining certain ID spaces within the configuration space to see what kind of device is connected to the channel control, or the operating system may check the management bit to determine if the chip being examined is a single device chip or a dual function chip. In one embodiment, as discussed above in FIG. 6, the operating system may check the ID's in certain set memory addresses within the PCI configuration space such as, for example, 00*h*, and 2Ch. If the operating system finds a device ID and Vendor ID in register 00*h* and a sub device ID and sub vendor ID in register 2Ch, then the operating system may determine that the device indicated by the ID's is controlled by the SCSI chip containing the PCI configuration space that is scanned. In one embodiment, the ID's may indicate that the device is a SCSI device. If, on the other hand, the operating system gets indications that the registers within the PCI configuration space are empty then the operating system determines that there is no device controlled by the device processor in which the PCI configuration space occupies.

Figure 8:
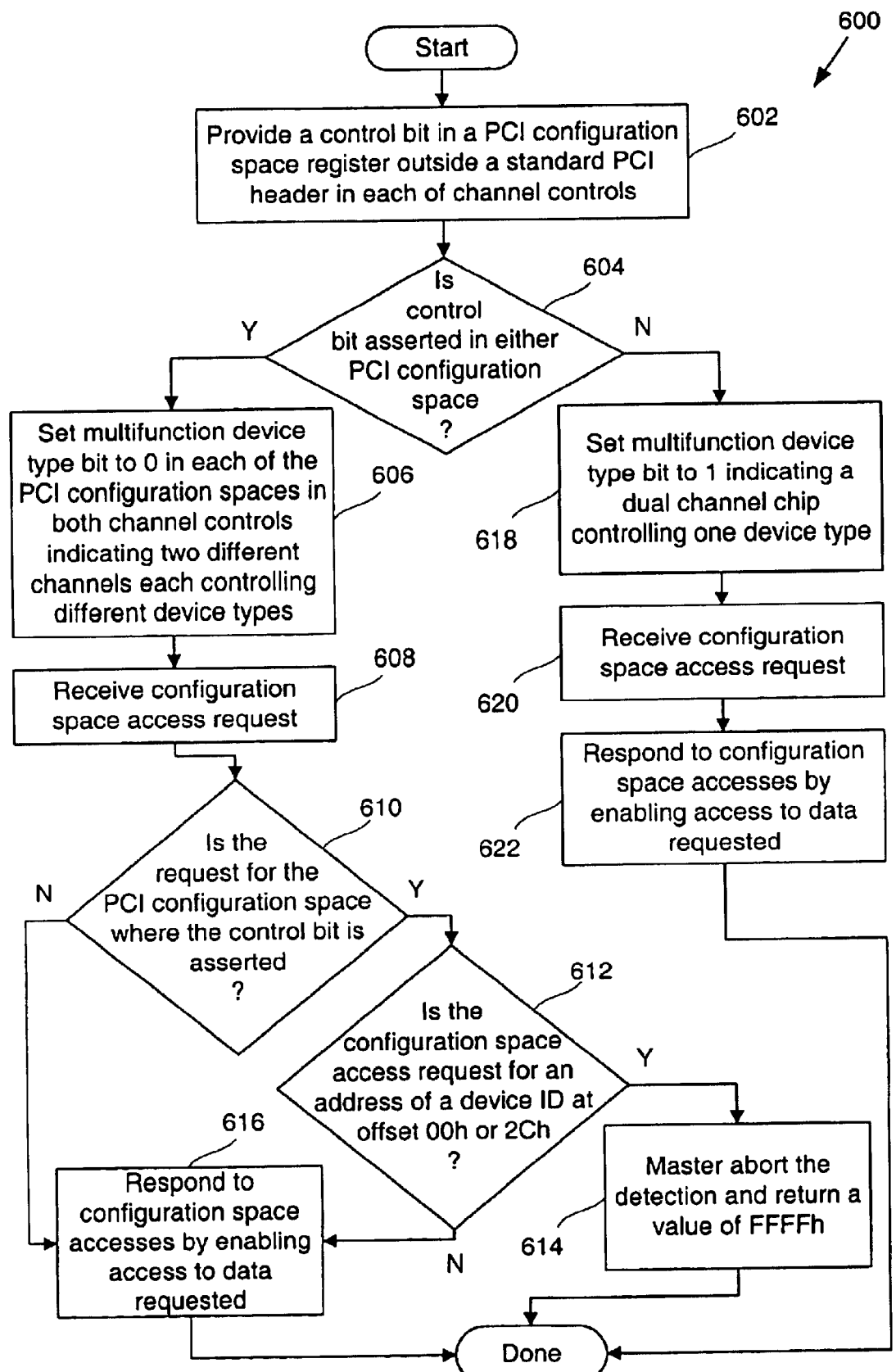
FIG. 8 illustrates a flowchart defining a method for managing a dual channel SCSI chip through utilization of a control bit in accordance with one embodiment of the present invention.

In another embodiment, as discussed in further detail in reference to FIG. 8, the dual channel SCSI chip may be configured so it can intelligently inform the operating system whether the dual channel SCSI chip controls one device or two devices. The dual channel SCSI chip may do this by setting a management bit such as, for example, a multifunction device type bit to certain values depending on what devices may be controlled by the chip. The functionality of the multifunction device type bit is described in reference to FIG. 8.

If the device is not controlled by the SCSI half of the two channel SCSI/RAID device then the method moves to operation 508 where the device is operated on. After operation 508, the method moves back to operation 502. If the device is controlled by the SCSI half of the two channel SCSI/RAID device then the method moves to operation 510 where the SCSI channel control is operated on. After operation 510, the method progresses to operation 512 where the RAID device is operated on by the RAID IOP because the method of flowchart 500 knows that the SCSI chip is a dual channel SCSI chip with a SCSI channel control and a RAID channel control. Then the method returns to operation 502.

FIG. 8 illustrates a flowchart 600 defining a method for managing a dual channel SCSI chip through utilization of a control bit in accordance with one embodiment of the present invention. In one embodiment, the dual channel SCSI chip through use of hardwiring through circuitry or software contained within the host adaptor may examine a control bit (which may be set by a user or pre-set at production) to determine whether the chip is a dual function device or a single function device. Depending on whether the control bit is asserted, the SCSI chip may respond differently to PCI configuration access requests by the operating system. By the different responses to the access requests and the setting of the multifunction device type bit, the operating system may be intelligently notified as to whether the dual channel SCSI chip is a single function device or a dual function device.

The method begins with operation 602 where a control bit is provided in a PCI configuration space register outside of a standard PCI header. Then operation 604 determines if the control bit is asserted. If the control bit is asserted, the method moves to operation 606 where a multifunction device type bit is set to 0 in each of the PCI configuration spaces in both channel controls thus indicating two different channels each controlling different device types. In one embodiment, one channel control may manage a SCSI device while the other channel control may control a RAID array as discussed in FIGS. 2A and 2B above. It should be understood that each of the channel controls of the dual channel SCSI chip of the present invention may control any suitable type of devices including other devices that are not SCSI or RAID. If the control bit is not asserted, the method moves to operation 618 as described below. After operation 606, the method progresses to operation 608 where a configuration space access request is received. In this operation, the operating system is attempting to determine what devices the SCSI chip controls by attempting to determine what identification data is included within the PCI configuration space of the channel control being examined. After operation 608, the method proceeds to operation 610 where it is determined whether the request is for the PC configuration space where the control bit is asserted. In this operation, if the operating system is attempting to discern the device connected to the channel control where the control bit of the channel control's PCI configuration space is asserted, the method moves to operation 612 and it is determined if the configuration space access request for an address of a device ID is at offset 00*h* or 2Ch. If the answer to operation 612 is yes then the method proceeds to operation 614 where the detection is master aborted and a value of FFFFh is returned. If the answer to operation 612 is no then the method moves to operation 616 where the configuration space accesses outside of offset 00*h* and 2Ch are responded to normally.

If the control bit is not asserted as determined by operation 604, the method moves from operation 604 to operation 618 where a multifunction device type bit is set to 1 indicating a dual chip controlling one device type. Because the control bit was not asserted in either PCI configuration space, the dual channel chip is designated to control only one type of device although each channel of the dual channel chip is capable of controlling a different device type. After operation 618, the method moves to operation 620 where a configuration space access request is received. In one embodiment, the operating system is examining the ID data in the configuration space of the channel control and in doing so requests access to configuration space data. Then operation 622 responds to configuration space accesses normally.

As indicated above, through use of the present invention, the operating system may be intelligently "fooled" into believing that one side of a dual channel SCSI chip is not controlling a device such as, for example, a RAID arrays. Therefore, if, for example, one channel control in a dual channel SCSI chip is dedicated to controlling a SCSCI device and the other channel control is dedicated to controlling a RAID arrays, conflicts between the operating system controlling the SCSI side and the RAID IOP controlling the other side may be avoided. Therefore, each channel control of the dual channel SCSI chip may function as independent channels as if they were located on two different processor chips even though both channels are conveniently and powerfully located on one SCSI chip. Consequently, by use of a dual channel SCSI chip and the present invention, more than one channel control may be utilized from only one SCSI chip without the problems of conflicts complicating management of the since SCSI chip.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for configuring channels of a dual channel SCSI chip, comprising:

setting at least one bit in a first configuration space within a first channel control in the dual channel SCSI chip, the first configuration space being configured to return a device identification information when accessed by an operating system; and setting at least one bit in a second configuration space within a second channel control in the dual channel SCSI chip, the second configuration space being configured to return data indicating that the second configuration space does not contain any device identification information when accessed by the operating system;

wherein the first channel control is detected and managed by the operating system, and the second channel control is not detected by the operating system and is managed by a device processor.

2. A method for configuring channels of a dual channel SCSI chip as recited in claim 1, wherein the at least one bit in the first configuration space includes a first control bit and the at least one bit in the second configuration space includes a second control bit, the first control bit and the second control bit being capable of determining which of the first channel control and the second channel control are hidden from the operating system.

3. A method for configuring channels of a dual channel SCSI chip as recited in claim 2, wherein the first control bit is located in register address FFh of the first configuration space and the second control bit is located in register address FFh of the second configuration space.

4. A method for configuring channels of a dual channel SCSI chip as recited in claim 1, wherein the first channel control is a SCSI channel control and the second channel control is a RAID channel control.

5. A method for configuring channels of a dual channel SCSI chip as recited in claim 1, wherein the device identification information includes at least one of a device ID, a vendor ID, a sub device ID, and a sub vendor ID.

6. A method for configuring channels of a dual channel SCSI chip as recited in claim 1, wherein the device processor is a RAID IOP.

7. A method for configuring channels of a dual channel SCSI chip as recited in claim 1, further comprising:

setting a first management bit for the first configuration space from a non-volatile memory.

8. A method for configuring channels of a dual channel SCSI chip as recited in claim 7, further comprising:

setting a second management bit for the second configuration space from the non-volatile memory.

9. A method for configuring channels of a dual channel SCSI chip as recited in claim 1, wherein the second configuration space is configured to return a read abort when the operating system requests access to the device identification information.

10. A method for configuring channels of a dual channel SCSI chip, comprising:

setting at least one bit in a first configuration space within a first channel control in the dual channel SCSI chip, the first configuration space being set to return a first device identification information when accessed by an operating system;

setting at least one bit in a second configuration space within a second channel control in the dual channel SCSI chip, the second configuration space set to return a null data indicating that the second configuration space does not contain any device identification information when accessed by the operating system;

returning the first device identification information from the first channel control when the operating system accesses the first configuration space; and returning a null data from a second channel control when the operating system requests access to the second configuration space;

wherein the first channel control is detected and managed by the operating system, and the second channel control is not detected by the operating system and is managed by a device processor.

11. A method for configuring channels of a dual channel SCSI chip as recited in claim 10, wherein the at least one bit in the first configuration space includes a first control bit and the at least one bit in the second configuration space includes a second control bit, the first control bit and the second control bit being capable of determining which of the first channel control and the second channel control are hidden from the operating system.

12. A method for configuring channels of a dual channel SCSI chip as recited in claim 11, wherein the first control bit is located in register address FFh of the first configuration space and the second control bit is located in register address FFh of the second configuration space.

13. A method for configuring channels of a dual channel SCSI chip as recited in claim 10, wherein the first channel control is a SCSI channel control and the second channel control is a RAID channel control.

14. A method for configuring channels of a dual channel SCSI chip as recited in claim 10, wherein the device identification information includes at least one of a device ID, a vendor ID, a sub device ID, and a sub vendor ID.

15. A method for configuring channels of a dual channel SCSI chip as recited in claim 10, wherein the device processor is a RAID IOP.

16. A method for configuring channels of a dual channel SCSI chip as recited in claim 10, further comprising:

setting a first management bit for the first configuration space from a non-volatile memory.

17. A method for configuring channels of a dual channel SCSI chip as recited in claim 16, further comprising:

setting a second management bit for the second configuration space from a non-volatile memory.

18. A method for configuring channels of a dual channel SCSI chip as recited in claim 10, wherein the second configuration space is configured to return a read abort when the operating system requests access to the device identification information.

19. A method for configuring channels of a dual channel SCSI chip, comprising:

providing a first control bit in a first PCI configuration space of a first channel control and a second control bit in a second PCI configuration space of a second channel control;

determining whether the first control bit is asserted and whether the second control bit is asserted;

when at least one of the first control bit and the second control bit is asserted,
marking the first PCI configuration space and the second PCI configuration space to indicate that the first channel control manages a first device type and the second channel control manages a second device type, the second device type being different than the first device type, responding to configuration space accesses from an operating system by allowing access to data in the first PCI configuration space when the first control bit of the first channel control is not asserted and by allowing access to data in the second PCI configuration space requested by the operating system when the second control bit of the second channel control is not asserted, responding to configuration space accesses by an operating system by not allowing access to data in the first PCI configuration space when the first control bit of the first channel control is asserted, and by not allowing access to data in the second PCI configuration space when the second control bit of the second channel control is asserted; and when neither of the first control bit and the second control bit are asserted,
marking the first PCI configuration space and the second PCI configuration space to indicate that the first channel control and the second channel control manage a same device type, responding to configuration space accesses by an operating system by allowing access to data requested by the operating system.

20. A method for configuring channels of a dual channel SCSI chip as recited in claim 19, wherein the first channel control is a SCSI channel control and the second channel control is a RAID channel control.

* * * * *